(12) United States Patent
Woditschka

(10) Patent No.: US 7,324,270 B2
(45) Date of Patent: Jan. 29, 2008

(54) MICROSCOPE WITH ADJUSTABLE OPTICAL ELEMENT

(75) Inventor: Christian Woditschka, Wetzlar (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 116 days.

(21) Appl. No.: 11/183,489

(22) Filed: Jul. 18, 2005

(65) Prior Publication Data

US 2006/0012859 A1 Jan. 19, 2006

(30) Foreign Application Priority Data

Jul. 19, 2004 (DE) .................... 10 2004 034 847

(51) Int. Cl.
*G02B 21/32* (2006.01)
(52) U.S. Cl. ...................................... 359/381
(58) Field of Classification Search ................. 359/381
See application file for complete search history.

(56) References Cited

U.S. PATENT DOCUMENTS 4,678,291 A 7/1987 Nyman et al.
5,585,964 A * 12/1996 Schalz ......................... 359/368

FOREIGN PATENT DOCUMENTS

GB 590665 7/1947

* cited by examiner

*Primary Examiner*—Joshua L Pritchett
(74) *Attorney, Agent, or Firm*—Houston Eliseeva LLP

(57) ABSTRACT

A microscope (1) with manual and external adjustability of an optical element (41) is disclosed. The optical element (41) is displaceable into an optical axis (20) determined by the microscope (1). The microscope (1) further encompasses a stand (3) and a tube (9) attachable to the stand (3). The optical element (41) is arranged on an adjustment element (45) in the interior of the stand (3). Provided in the interior of the stand (3) is a closure element (26) that enables access to the adjustment element (45) when the optical element (41) is positioned in the optical axis (20) of the microscope.

14 Claims, 6 Drawing Sheets

MICROSCOPE WITH ADJUSTABLE OPTICAL ELEMENT

RELATED APPLICATIONS

This application claims priority of the German patent application 10 2004 034 847.2 which is incorporated by reference herein.

FIELD OF THE INVENTION

The invention concerns a microscope with an adjustable optical element.

BACKGROUND OF THE INVENTION

U.S. Pat. No. 4,678,291 discloses an optical apparatus for microscopes. The apparatus makes possible a rapid changeover between two different observation methods of the microscope. The apparatus encompasses a dovetail guide on which the Bertrand lens is guided. The Bertrand lens can be shifted in the beam path by way of a threaded spindle. The threaded spindle makes possible accurate positioning of the Bertrand lens. It must be noted here, however, that the Bertrand lens is continuously positioned in the beam path, and in the case of the apparatus described here no provision is made for pivoting the Bertrand lens in and out.

GB Patent 590,665 describes an improvement for microscopes, in which the Bertrand lens is provided in the beam path of the microscope between the objective and the eyepieces. The Bertrand lens is secured at opposite ends in a ring-like holding element, and the holding element can be pivoted into the beam path of the microscope. Also associated with the Bertrand lens is a diaphragm that, in an embodiment of the invention, can be adjusted from outside. Adjustments of the diaphragm associated with the Bertrand lens can be performed irrespective of the position of the annular holder, i.e. an adjustment is possible even when the Bertrand lens is not in the beam path.

SUMMARY OF THE INVENTION

It is the object of the invention to create a microscope in which an alignment opening in the stand is closed off in dust- and light-tight fashion, and opens only when an element requiring alignment is placed in the beam path of the microscope. A further object of the invention is to prevent damage to optical components in the interior of the microscope that might result from improper use of tools through holes that might be present in the microscope.

The aforesaid object is achieved by way of a microscope comprising: an optical element, wherein the optical element is displaceable into an optical axis determined by the microscope, the microscope further comprises a stand and a tube which can be connected to the stand; an adjustment element is connected with the optical element, wherein the optical element and the adjustment element are arranged in the interior of the stand; and a closure element is provided that enables access to the adjustment element when the optical element is positioned in the optical axis of the microscope.

The invention has the advantage that the optical element and the adjustment mechanism are arranged in the interior of the stand. Also provided is a closure element that enables access to the adjustment mechanism when the optical element is arranged in the beam path of the microscope.

The optical element is arranged on a slider movable in the horizontal direction. The optical element is a Bertrand lens. Embodied in the stand of the microscope is an opening behind which the closure element is provided. In addition to the optical element—which, as already mentioned, is a Bertrand lens—at least one prism is additionally arranged on the slider, the slider being actuatable from outside the stand of the microscope. The adjustment mechanism is an alignment screw that is actuatable through the opening in the stand by means of a tool.

The closure element is impinged upon by a tension spring. The adjustment element actuates the closure element in order thereby to enable access to the adjustment element. The tension spring acts on the closure element in such a way that access to the adjustment element is blocked when the adjustment element is not coacting with the closure element.

The closure element is a plate-shaped component that is mounted pivotably about a shaft. The plate-shaped component possesses a rounded protrusion on the side opposite to the opening embodied in the stand. In addition, a first and a second parallel rib are embodied on either side of the shaft, the two being separated by a trench. The first rib is longer than the second rib. The adjustment element of the optical component coacts with the first rib of the closure element, and as a result the closure element is pivoted about the shaft in such a way that the opening in the stand of the microscope aligns with an adjustment screw in the closure element.

The part of the microscope stand that is embodied with the opening is additionally equipped with a cover. The cover also serves, among other purposes, to enclose any structural elements of the stand, and to impart to the entire microscope a smoother appearance and a smoother outer skin which is substantially easier to clean and less susceptible to soiling.

A push/pull rod with which the slider having the optical components is actuatable projects from the microscope stand. By pulling or pushing, the particular optical component required can be introduced into the beam path of the microscope. In a preferred embodiment of the invention, the tube of the microscope possesses a lateral port. The push/pull rod projects out of the microscope stand in the region of the lateral port. Arranged on the slider, in addition to the optical component, is at least one prism that, by displacement of the slider, can be introduced into the beam path of the microscope, thus shifting the beam path to the port.

The microscope can be embodied as an inverted microscope.

Further advantageous embodiments of the invention may be inferred from the dependent claims.

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
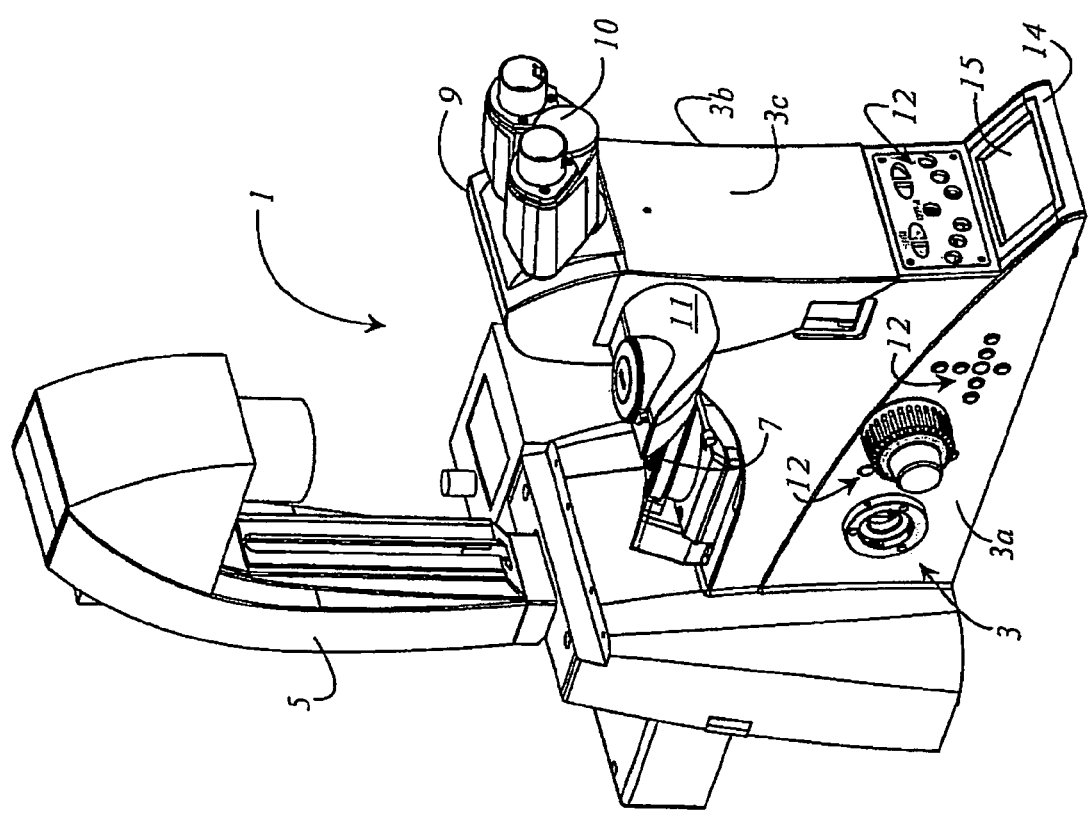
FIG. 1 is a perspective view of an inverted microscope into which the invention is integrated.

FIG. 1 shows an embodiment of microscope 1 in which the present invention is implemented. As depicted here, microscope 1 is an inverted microscope, which in no way is to be construed as a limitation of the invention. It is self-evident to anyone skilled in the art that the present invention can also be used in an upright microscope. Microscope 1 comprises a base stand part 3 that supports an illumination stand part 5. Sitting on base stand part 3 is a revolving nosepiece 7 with which the user can pivot various objectives (not depicted) into the beam path of the microscope in motorized fashion. The end of base stand part 3 facing toward the user carries a tube 9 that is equipped with an eyepiece 10. A port 11 is also mounted on tube 9. Base stand part 3 comprises a first lateral surface 3a, a second lateral surface 3b, and a front surface 3c facing toward the user. Distributed over first lateral surface 3a, front surface 3c, and second lateral surface 3b are multiple actuation elements 12 with which the user can actuate motorized microscope functions. Base stand part 3 possesses a wedge-shaped extension 14 facing toward the user. Inset into wedge-shaped extension 14 is a display 15 with which the user can read off the settings of microscope 1.

Figure 2:
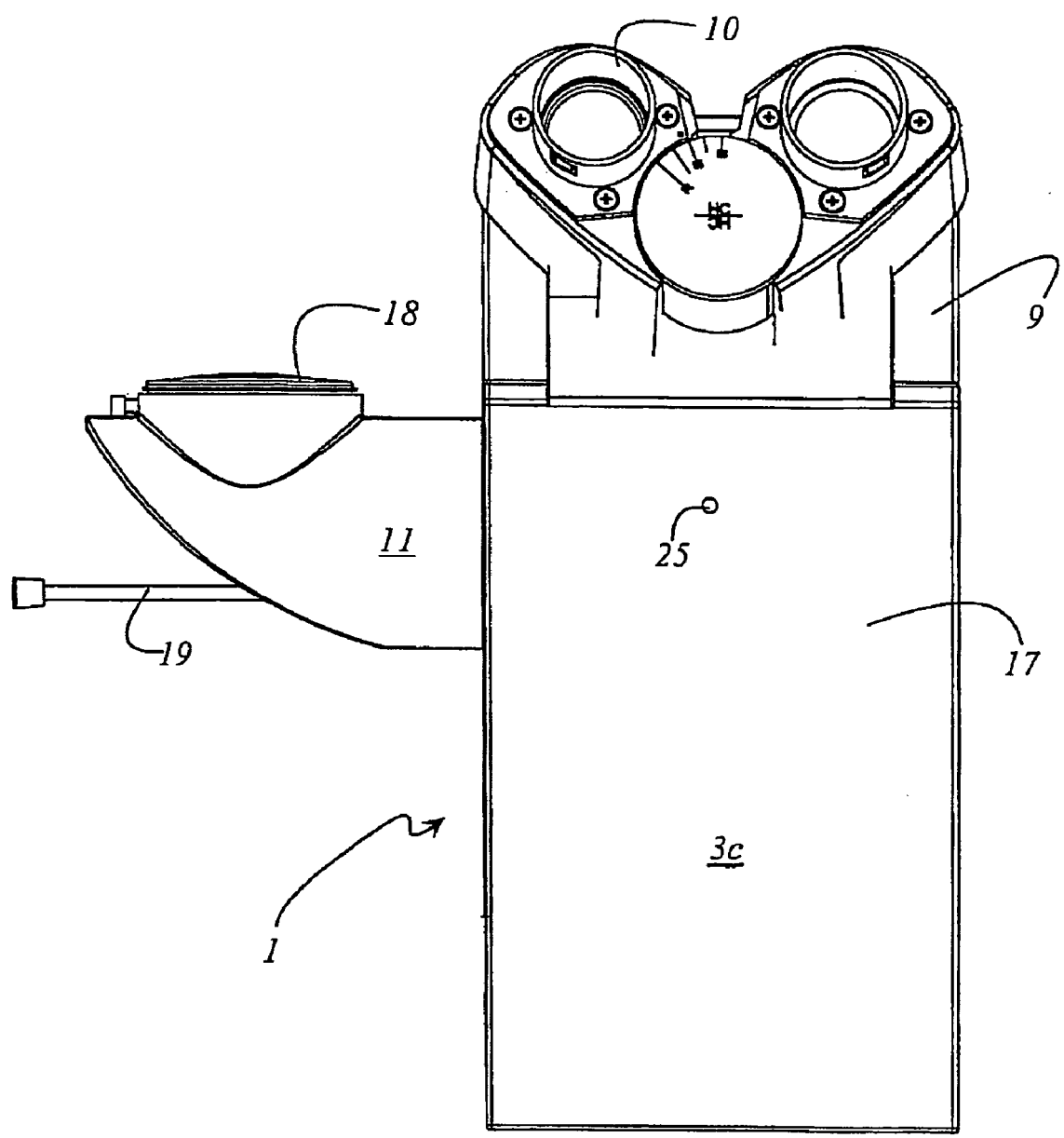
FIG. 2 is a frontal view of the region of the inverted microscope around the tube.

FIG. 2 is a frontal view of microscope 1 in which not all parts of microscope 1 are depicted. Front surface 3c is equipped with a cover 17. Tube 9 is set in place above cover 17. In the embodiment depicted here, tube 9 possesses an eyepiece 10 and a port 11. Port 11 is equipped with a flange 18 on which, for example, a camera can be placed. Also provided on port 11 is a push/pull rod 19 with which, for example, a beam path 20 of microscope 1 can be switched over to port 11. Flange 18 of port 11 likewise defines a beam path 21. The elements in the interior of microscope 1 that are actuated by push/pull rod 19 are explained in more detail in FIGS. 5 and 6. Embodied in cover 17 that is mounted on front surface 3c of microscope 1 is an opening 25 through which access to the interior of microscope 1 is possible.

Figure 3:
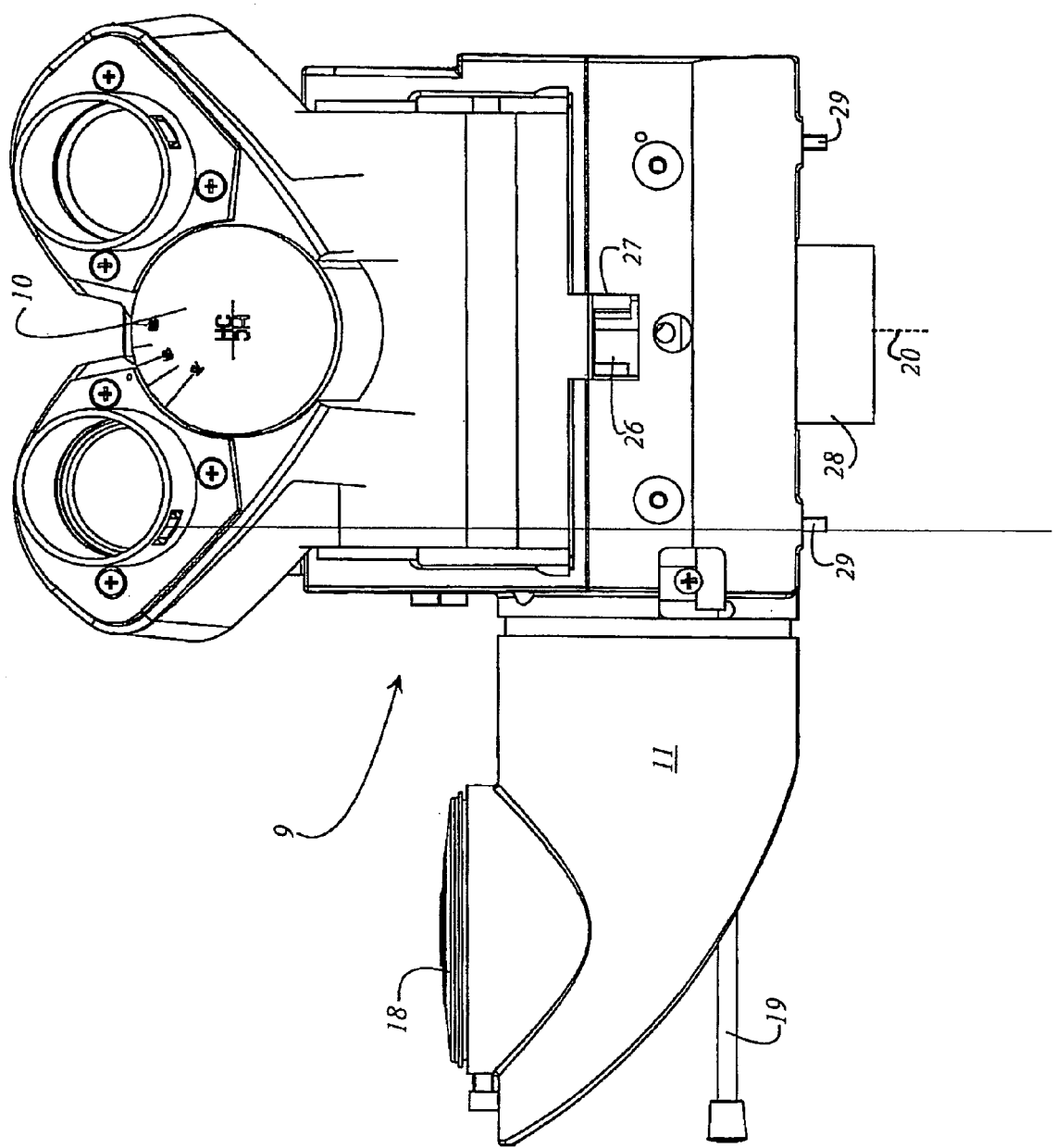
FIG. 3 is an enlarged depiction of the region of the inverted microscope around the tube, the cover on the end surface of the inverted microscope having been removed.

FIG. 3 is a detail view of tube 9 that can be placed onto microscope 1. As already mentioned, the tube possesses an eyepiece 10 with which the user can visually observe or view the image of a specimen. Tube 9 and microscope 1 define optical axis 20. A port 11 is also mounted on tube 9. Port 11 furthermore possesses a flange or thread or bayonet closure onto which a camera (not depicted) can be attached. Flange 18 likewise defines an optical axis 21. A movable push/pull rod 19 is provided on port 11. Push/pull rod 19 acts on a slider (see FIGS. 5 and 6), provided in tube 9, with which a closure element 26 is actuatable. Tube 9 possesses, in the region of closure element 26, a cutout 27 which enables access to closure element 26 from outside tube 9. Tube 9 possesses a tubular extension 28 and several mounting screws 29 that coact with base stand part 3 of microscope 1, in order to ensure secure mounting of tube 9 on base stand part 3. As is evident from FIG. 3, optical axis 20 of the microscope extends centrally through tubular extension 28.

Figure 4:
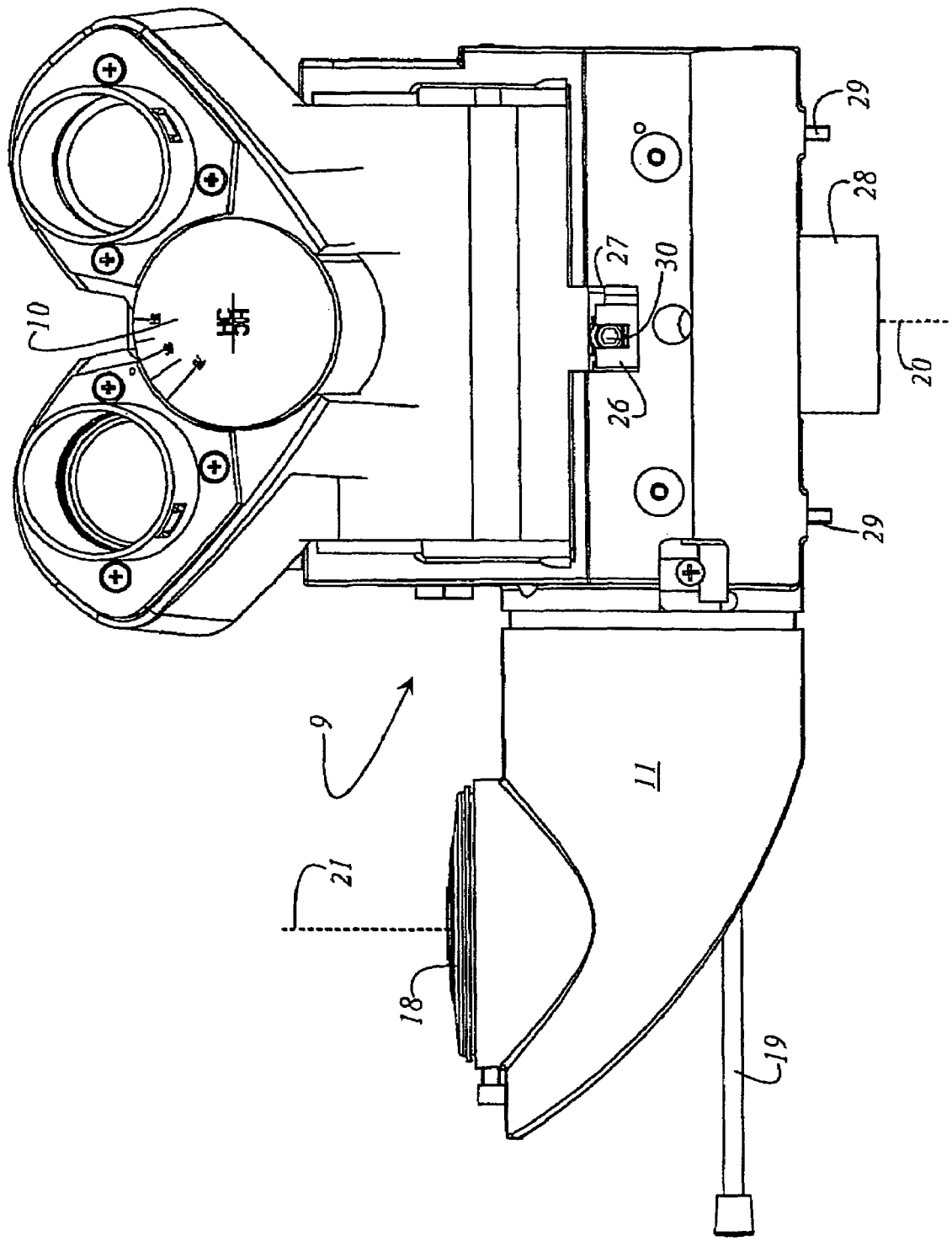
FIG. 4 is an enlarged depiction of the region of the inverted microscope around the tube, the cover on the end surface of the inverted microscope having been removed and the position of the closure element being such that access to the adjustment element is possible.

FIG. 4 is a frontal view of tube 9 according to the present invention, in which push/pull rod 19 has been pulled out of port 11. As a result of the displacement of push/pull rod 19, closure element 26 is also displaced in the interior of tube 9. The displacement of closure element 26 enables access to an adjustment element 30. Adjustment element 30 is a screw that can be actuated using a tool (not depicted). Adjustment element 30 acts on an optical element that is arranged on a slider. The optical element is thereby introduced into optical axis 20 of the microscope, and can be aligned more accurately within optical axis 20 by means of screw 30.

Figure 5:
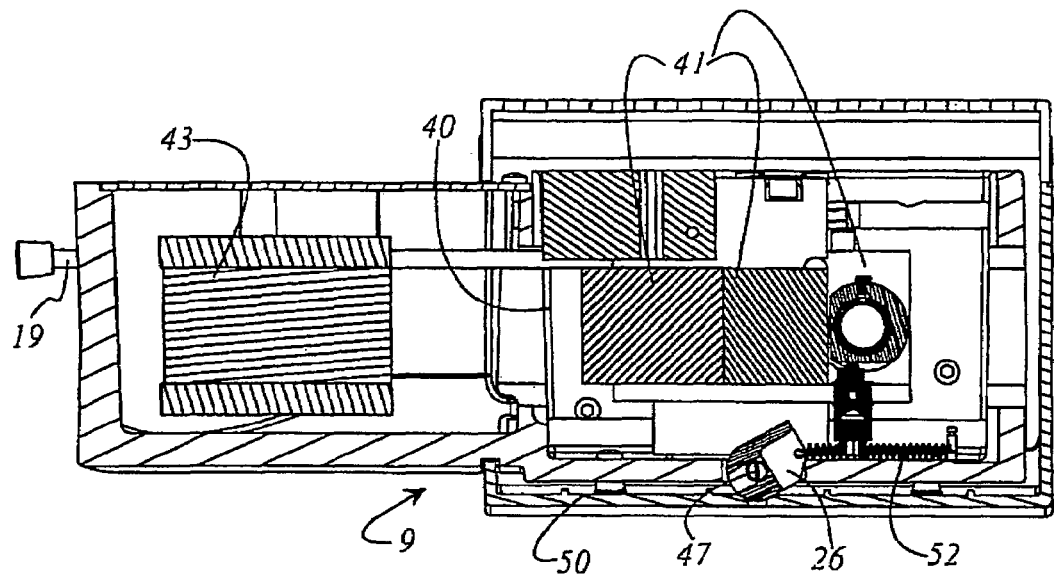
FIG. 5 is a plan view of the slider and the closure element that are arranged in the interior of the microscope stand.

FIG. 5 is a detail view of a slider 40 in the interior of tube 9. Slider 40 carries multiple optical elements 41. In the embodiment depicted in FIG. 5, three optical elements 41 are arranged on slider 40. One optical element can be, for example, a prism, and another optical element 41 is a Bertrand lens. A further prism 43, which receives the light beam from the prism arranged on the slider and deflects it into optical axis 21 of flange 18 of port 11, is arranged in port 11. Optical element 41, which is the Bertrand lens, is connected to an adjustment element 45. Also arranged in the interior of tube 9 is a closure element 26 that is mounted rotatably about a shaft 47. Slider 40 is partially surrounded by a housing wall 50 of tube 9. Cutout 27 through which closure element 26 partially protrudes is embodied in housing wall 50. Shaft 47 of closure element 26 is also supported in housing wall 50. A pin that provides an engagement point for a tension spring 52 is arranged in the interior of housing wall 50. A further engagement point for tension spring 52 is embodied on closure element 26.

Figure 6:
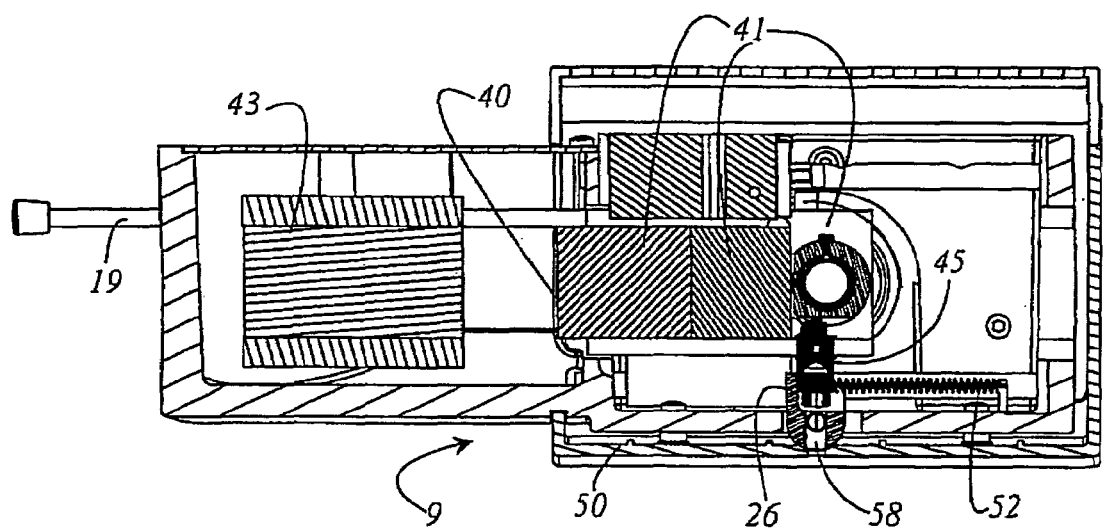
FIG. 6 is a plan view of the slider and the closure element that are arranged in the interior of the microscope stand, the closure element having a position such that access to the adjustment element is enabled.

FIG. 6 shows the position of push/pull rod 19 in which the Bertrand lens is positioned in the optical axis of microscope 1 and of tube 9. Attached to the Bertrand lens is an adjustment element 45 that, in this position, coacts with closure element 26. Tension spring 52 is also tensioned between pin 51 and adjustment element 26. Adjustment element 26 is embodied with a trench 58 that, in the position depicted in FIG. 6, aligns with opening 25 in cover 17 for tube 9 and for end surface 3c of the microscope.

Figure 7:
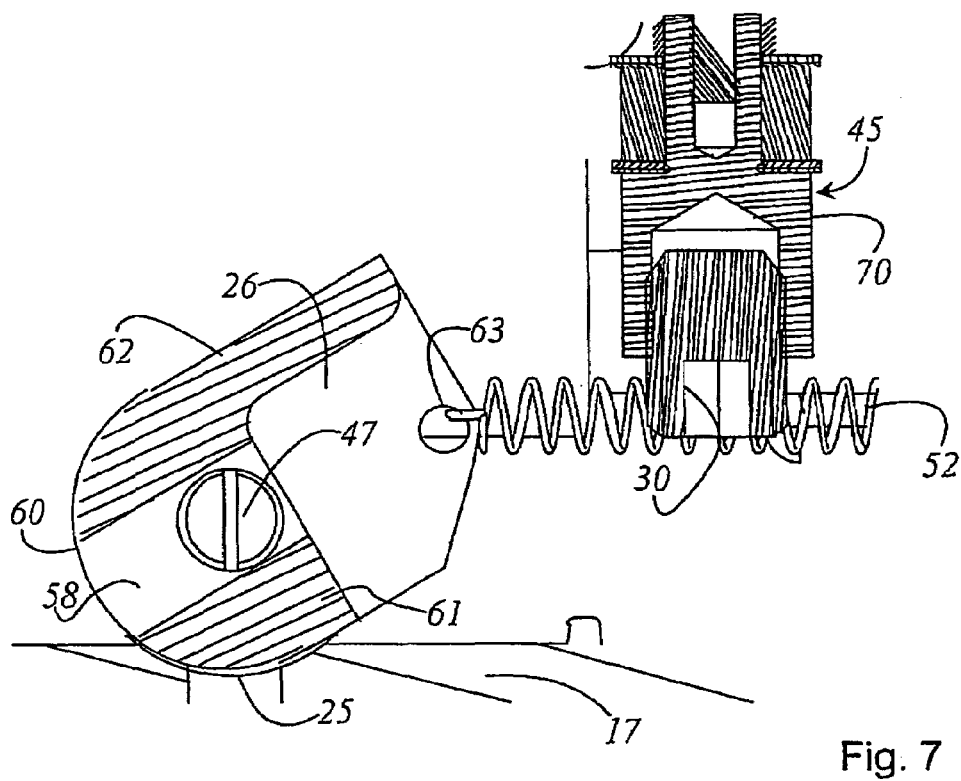
FIG. 7 is an enlarged depiction of the closure element which is in the closed position.

FIG. 7 is a detailed depiction of closure element 26 in the closed position. Closure element 26 is embodied in the form of a plate-shaped component. Closure element 26 is mounted rotatably about a shaft 47. Closure element 26 has a rounded protrusion 60 on the side that is opposite to opening 25 in cover 17. A first rib 61 and a second rib 62 are shaped on either side of shaft 47 of closure element 26. First rib 61 and second rib 62 are separated from one another by trench 58. Engagement point 63 for tension spring 52 is embodied on closure element 26. Adjustment element 45 encompasses a bushing 70 in which adjustment screw 30 is guided. Bushing 70 of adjustment element 45 coacts with second rib 62, which is longer than first rib 61.

Figure 8:
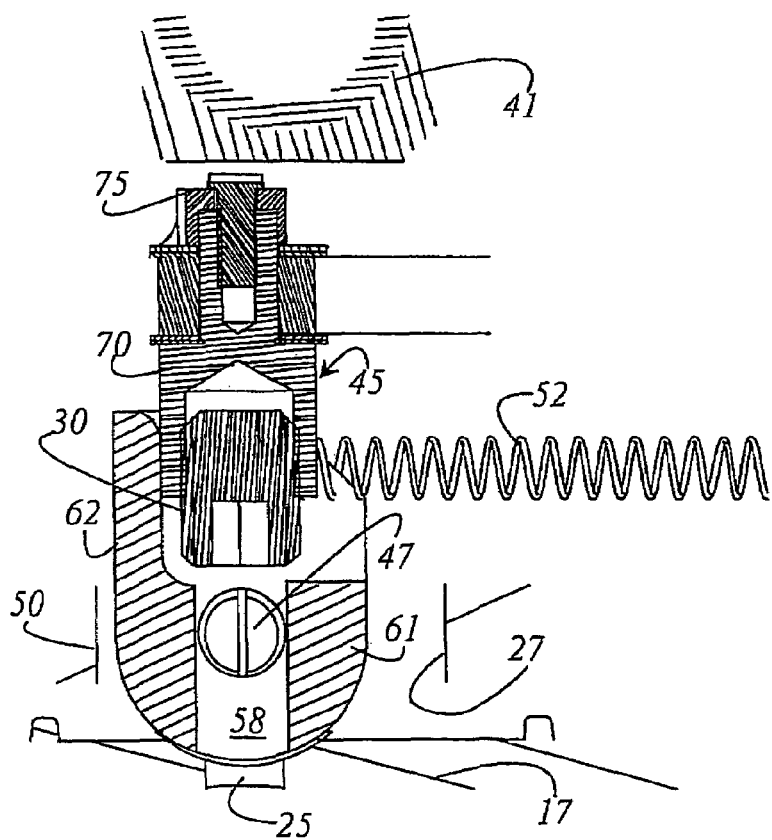
FIG. 8 is an enlarged depiction of the closure element which is in the open position.

FIG. 8 is likewise an enlarged depiction of closure element 26 that coacts with adjustment element 45. When push/pull rod 19 has been pulled out of tube 9 or port 11, bushing 70 comes into working engagement with second rib 62, with the result that closure element 26 is rotated about shaft 47. The trench configured in the closure element now aligns with opening 25 in cover 17 and with adjustment screw 30 provided in bushing 70 of adjustment element 45. As already mentioned, in this position tension spring 52 is tensioned, and thus exerts a return force on closure element 26. When adjustment element 45 is no longer in a working relationship with closure element 26, the tensioned tension spring 52 then exerts a return force on the adjustment element and closes off opening 25 embodied in cover 17. In the position depicted in FIG. 8, end 75 of adjustment element 45 facing away from adjustment screw 30 coacts with the Bertrand lens (optical element 41). Displacement of adjustment screw 30 causes end 75 of the adjustment element to press onto optical element 41, positioning the latter correspondingly in the optical axis of microscope I and tube 9. Also shown in FIG. 8 is cutout 27 in housing wall 50 of tube 9, through which closure element 26 engages and in which closure element 26 is free to pivot.

The invention has been described with reference to a particular embodiment. It is self-evident, however, that changes and modifications can be made without thereby leaving the range of protection of the claims below.

What is claimed is:

1. A microscope comprising:
   an optical element slidably displaceable into an optical axis defined by the microscope;
   an adjustment element connected with the optical element, wherein the optical element and the adjustment element are arranged inside a stand of the microscope; and
   a closure element displaceable inside the stand is provided that enables access to the adjustment element from outside of the microscope when the optical element is positioned in the optical axis of the microscope, the closure element being impinged upon by a tension spring;
   wherein the adjustment element is accessible when the adjustment element actuates the closure element; and wherein the adjustment element is blocked when the tension spring acts on the closure element in such a way that the adjustment element is not coacting with the closure element.

2. A microscope comprising:
   an optical element slidably displaceable into an optical axis defined by the microscope;
   an adjustment element connected with the optical element, wherein the optical element and the adjustment element are arranged inside a stand of the microscope; and
   a closure element displaceable inside the stand is provided that enables access to the adjustment element from outside of the microscope when the optical element is positioned in the optical axis of the microscope,
   wherein the closure element is a plate-shaped component that is mounted pivotably about a shaft; the plate-shaped component comprises a rounded protrusion on the side opposite to the opening; and a first parallel rib and a parallel second are embodied on either side of the shaft, the two parallel ribs being separated by a trench.

3. The microscope as defined in claim 2, wherein the optical element is arranged on a slider movable in the horizontal direction.

4. The microscope as defined in claim 3, wherein the optical element is a Bertrand lens.

5. The microscope as defined in claim 2, further comprising an opening in the stand, wherein the closure element is provided behind the opening.

6. The microscope as defined in claim 2, further comprising the optical element and at least one prism; are arranged on a slider, the slider being actuatable from outside the stand of the microscope.

7. The microscope as defined in claim 2, wherein the adjustment element encompasses an alignment screw that is actuatable through the opening in the stand by means of a tool.

8. The microscope as defined in claim 2, wherein the first rib is shorter than the second rib.

9. The microscope as defined in claim 2, wherein the closure element is pivotably movable about the shaft to alight the opening with an adjustment screw of the adjustment element when the adjustment element of the optical component coacts with the second rib of the closure element.

10. The microscope as defined in claim 2, further comprising an additional cover with a part of the microscope stand having the opening.

11. The microscope as defined in claim 2, further comprising a push/pull rod which acts on a slider comprising optical components, the push/pull rod being projected from the microscope stand.

12. The microscope as defined in claim 2, wherein the microscope further comprises a tube with a lateral port; and wherein at least one prism is additionally disposed on the slider for shifting a beam path of the microscope to the lateral port by displacing the slider.

13. The microscope as defined in claim 2, wherein the microscope is an inverted microscope.

14. The microscope as defined in claim 13, wherein the inverted microscope comprises:
   a base stand part carrying an objective nosepiece and an illumination stand part that is mounted on the base stand part;
   the base stand part comprising a first lateral surface, a second lateral surface, and an end surface facing toward the user;
   a plurality of operating knobs for actuating motorized microscope functions, the plurality of operating knobs being provided on the first and second lateral surfaces and the end surface; and
   the operating knobs being combined into multiple groups each comprised of multiple operating knobs.

* * * * *